(12) United States Patent
Handley et al.

(10) Patent No.: US 6,954,532 B1
(45) Date of Patent: Oct. 11, 2005

(54) SELECTIVE ENCRYPTION OF MIXED RASTER CONTENT LAYERS

(75) Inventors: John C. Handley, Fairport, NY (US); Robert R. Buckley, Rochester, NY (US)

(73) Assignee: Xerox Corporation, Stamford, CT (US)

( * ) Notice: Subject to any disclaimer, the term of this patent is extended or adjusted under 35 U.S.C. 154(b) by 816 days.

(21) Appl. No.: 09/633,734

(22) Filed: Aug. 7, 2000

(51) Int. Cl.[7] .......................... G09C 3/00; G09C 5/00; H04N 7/167; G06K 9/54; G06K 9/60
(52) U.S. Cl. ..................... 380/54; 380/216; 382/302
(58) Field of Search ................... 380/54, 216; 382/302

(56) References Cited

U.S. PATENT DOCUMENTS

| | | | |
|---|---|---|---|
| 4,912,761 A | 3/1990 | Tan et al. | 380/18 |
| 5,372,387 A | 12/1994 | Wajda | 283/87 |
| 5,748,780 A * | 5/1998 | Stolfo | 382/232 |
| 5,812,989 A | 9/1998 | Witt et al. | 705/45 |
| 6,031,575 A * | 2/2000 | Suzuki et al. | 375/240.14 |

* cited by examiner

Primary Examiner—Gilberto Barrón, Jr.
Assistant Examiner—Benjamin E. Lanier
(74) Attorney, Agent, or Firm—Fay, Sharpe, Fagan, Minnich & McKee, LLP

(57) ABSTRACT

What is disclosed is an image path for work flow or printing in which a scanner or image editor produces a raster image. The raster image is segmented into a background plus a plurality of objects represented as foreground, mask pairs (henceforth the background or a foreground, mask pair will be referred to as a field). Each field possesses a potentially different security level. Each security level corresponds to a public encryption key used to encrypt each layer with its corresponding security level. A publicly known file storage and transmission format that supports mixed raster content is used to store or transmit the raster image. Upon retrieval or reception, a viewer enters in a private key into a user interface. The private key can only decrypt that content to which the viewer is authorized.

9 Claims, 4 Drawing Sheets

SELECTIVE ENCRYPTION OF MIXED RASTER CONTENT LAYERS

FIELD OF INVENTION

This inventions relates the area of Image processing path and work flow architecture incorporating encryption into the mixed raster content image model.

BACKGROUND OF THE INVENTION

In the arts, a digital document can often be represented as a raster, i.e., a rectangular array of samples or pixels, wherein, in the simplest non-trivial form, a page is decomposed into three layers which are: a lower layer, a mask layer, and an upper layer. The mask layer indicates from which of the two layers one should take a pixel to produce a final image. One advantage of this model is that it can afford greater image compression by separating a page into two image types and using respective compression schemes optimal for each type. Further, one can separate a page image into a plurality of image types, not just three. In the N-layer model, there is a lower layer (the background) layer, a first mask layer, a first foreground layer, a second mask layer, a second foreground layer, and so on.

Digital document images can be represented in varying degrees of complexity depending on what is known about them. One of the simplest and easiest to interchange is a raster representation. As an array of pixel values, its simplicity is nearly that of a paper document. Yet another representation is in portable document format. At the other extreme, a document can be represented in a markup language or page description language which details each symbol in the document and how it should appear when printed or displayed. These latter forms are typically produced by a word processor or electronic publishing system. The raster form is typical for a scanned document, i.e., a paper document 'read' by an image capture device. Converting raster documents to a markup version can be a difficult technical problem and is often the subject of academic and industrial research in document recognition. Except in specialized applications, a 'recognized' document is likely to contain many errors. The mixed raster content model offers a practical intermediate form, i.e., more structure than a raster but less than a marked-up document. As a collection of rasters, it also enables simple and ubiquitous document image interchange. The present invention herein is directed towards a secure document workflow system in which the mixed raster content model is exploited to perform a function for which it was not designed but for which it is consistent, to extend the utility of this model.

Consider the following example. A credit card processing center wishes to scan and store credit card receipts as a record of its customers' purchases. The system enables one of its trusted operators to view a receipt image online perhaps to verify a charge. Printed facsimiles of each customer's receipts can also be mailed to that customer. For security reasons, it is not preferred that a customer's credit card number be printed on a facsimile document. A customer would know his or her own number(s) so there would be no reason for an intermediary party to view it. The system stores receipt images in a mixed raster content format wherein the lower layer contains all the information except for the credit card number field and the mask or upper layer contains the credit card number field. The raster layer is preferably encrypted with a key available only to a trusted operator or the customer, or both. The encrypted layer is unintelligible to a printing system. The upper and lower layers may have been selectively encrypted.

And, consider a further workflow scenario wherein it is desired that different parts of a scanned document be viewable by different parties. For example, an online resume service may encrypt certain information and make it available for paying customers such as a scanned resume and cover letter may have document regions indicating race and gender encrypted by one key and salary requirements encrypted by another key. The actual encryption method depends on the application and any known in the prior art may be used. These requirements are met by an N-layer mixed raster content model in which each layer has a different key available only to the appropriate person in the hiring process.

In both of the above discussed considerations, documents are obtained as rasters yet full and error-free conversion to a markup language is expensive. In the credit-card case, very few of the documents would be viewed so it makes little sense to convert them.

Determining which areas to encrypt may be done automatically by knowing which regions on a document contain sensitive information. Regions may also be determined by a scanner operator or regions may be determined through document recognition: e.g., identifying credit card numbers or social security numbers through optical character recognition in combination with a lexicographical analyzer.

In a document workflow system, there is a need to provide a plurality of security levels and also a need to use existing image encoding methods to reduce cost and increase system flexibility. Further, security must be provided simply for scanned documents that exist as images. Word processing systems' passwords do not provide a plurality of access levels. In word processing systems these documents exist as symbols and are not scanned.

In other cases, secure faxing and printing systems treat the entire document and do not allow for fields or regions to be encrypted separately.

U.S. Pat. No. 4,912,761 entitled "Security Facsimile Systems" discloses a method to ensure secure fax transmission by splitting a page into to separations, neither one of which is readable alone. Upon reception, each separation is printed out separate pages, one on paper and the other on a transparency. The designated recipient overlays the two sheets to see the document. This invention underscores the need for secure transmission. This invention allows anyone to pick up the two sheets and combine them; there is no encryption. Each sheet is unreadable and therefore cannot offer selective viewing to different readers with different levels of security. Both separations are needed simultaneously, and the page is read as a whole or not at all.

A document would be stored in electronic memory in a FAX machine until a key is entered into the machine (this can be also done by having a secure storage bin or mail box and a physical key to unlock the box). What is also needed in the art is to allow different users the ability to see only portions of a document. This would be important in a fulfillment workflow where customers fax in forms with credit card numbers entered. Only those operators needing to process the credit authorization can be allowed to view or print the credit card information. Other, less trusted operators can commence order processing.

U.S. Pat. No. 5,372,387 entitled "Security Device for Document Protection" discloses a chemical means to obtain some of the functionality to which the present invention is directed, e.g., areas of a document are coated with an opaque substance that becomes clear when heated wherein secure information is printed then coated. A special reader is then used to disclose the secure information. Also, chemicals with different heat sensitivities may be used to afford different levels of security. The drawback being that it does not secure electronic documents necessary in modern work flows. Levels of security are less flexible, i.e., those with the hotter reader can read more. Anyone can conceivably obtain a reader, or security is limited by availability of readers. This is not as secure as encryption which is mathematically unlimited.

U.S. Pat. No. 5,812,989 entitled "Image Statement Preparation by Work Flow Management Using Statement Cycles and Statement Interactive Cycles" discloses a system in which bank checks are processed to provide account statements that include payments against an account and images of corresponding checks drawing on that account. In a high-volume work flow environment where alphanumeric account information and check images are obtained at different stations, it is possible for information to be out of synchronization. Operators can view suspected erroneous statements and make corrections. Operators have different levels of authorization depending on their skill level: some problems are easy to fix, some require more effort or have less tolerance for error. Profiles of operators are stored in a database, so that upon logging into the system, an operator can see only statements authorized for an operator's skill level. This system demonstrates the need for selective security in a document workflow system. However, security is offered document-by-document, not region-by-region within a document.

The present invention also covers an application in which regions in a scanned document are available in a given time interval. There are time-sensitive work flows in which fields expire or become relevant only after a certain date or time has passed. For example, a work flow in which activity must be accounted, but summarized monthly. A document for next month may arrive now, but should not appear on this month's summary. By encrypting fields with a time-dependent key, an operator would not have the possibility of seeing confusing fields. Also, some information becomes stale, such as expired credit card numbers, and could be readily viewed by all without harm.

Encrypted regions could be of any shape and be used to shield any image content such as faces, adult content, license plate numbers, logos, or any other identifying or offensive image portions.

It is the aim of the present invention to overcome the above identified prior art problems.

SUMMARY OF THE INVENTION

The present embodiment is an image path for work flow or printing in which a scanner or image editor produces a raster image. The raster image is segmented into layers, including a background plus at least one foreground and at least one mask (henceforth the background, foreground, or mask will be referred to as a field). Each field possesses a potentially different security level. Each security level corresponds to an encryption key used to encrypt each layer with its corresponding security level. A publicly known file storage and transmission format that supports mixed raster content is used to store or transmit the raster image. Upon retrieval or reception, a viewer enters in a key into a user interface. The key can only decrypt that content to which the viewer is authorized. In the preferred embodiment, each field is encrypted with a public key and decrypted with a private key.

Additional benefits and advantages of the present invention will be set forth in the description which follows, and in part will be obvious from the description, or may be learned by the practice of this invention. The advantages of this invention, as described herein, may be realized and obtained by means particularly pointed out and distinctly claimed in the appended claims, taken in conjunction with the accompanying drawings and detailed specification.

BRIEF DESCRIPTION OF THE DRAWINGS

In order that the manner in which the above-recited and other advantages and objects of the present invention are obtained, a more particular description of this invention, briefly described above, will be rendered by reference to a specific embodiment thereof which is illustrated in the appended drawings. Understanding that these drawings depict only a typical embodiment of the present invention and are not therefore to be considered in any way limiting of its scope, this invention will be described and explained with additional specificity and detail through the use of the accompanying drawings, in which.

DETAILED DESCRIPTION OF THE SPECIFICATION

The present embodiment is an image path for work flow or printing in which a scanner or image editor produces a raster image. The raster image is segmented into layers, including a background plus at least one foreground and at least one mask; hereinafter, the background, foreground or mask will be referred to as an field.

Figure 1:
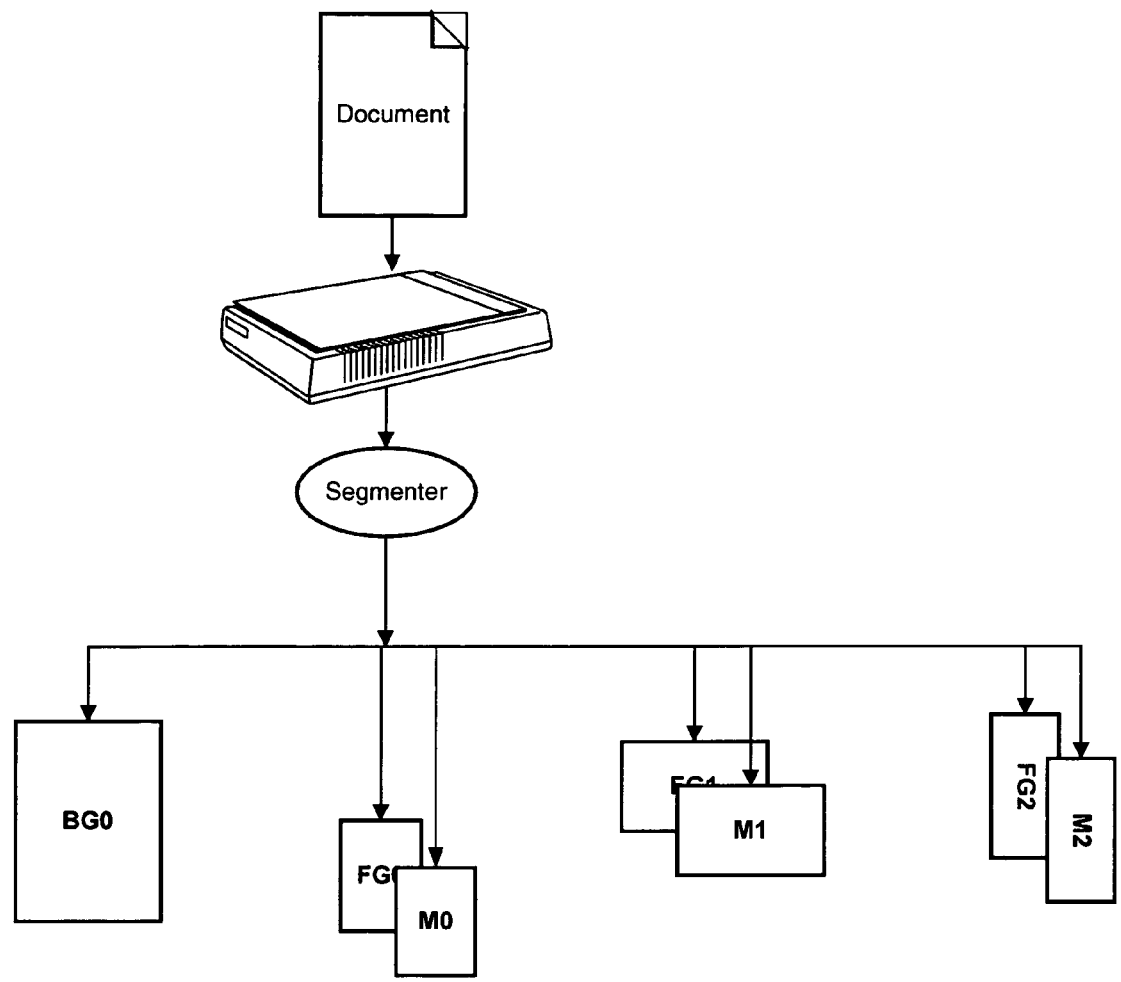
FIG. 1 illustrates a document broken into Mixed Raster Content layers with a background layer BG0, foreground layers FG0, FG1, and FG2, and planes M0, M1, and M2 are masks for foreground layers FG0, FG1, and FG2, respectively.

In the present invention, a document is scanned into a raster representation. A segmenter separates the document image into plurality of fields either aided by an operator or automatically by a computer algorithm wherein each field has a security level associated with it. The association can be either done by an operator or algorithm in a case-by-case basis, or can be done is a fixed manner, depending on the application. This process is illustrated in FIG. 1 where a document image is segmented into three fields FG0/M0, FG1/M1, FG2/M2 plus the background, BG0. A field is indicated by a region of the document image FGi and a binary mask, Mi. The mask is a spatial array of binary values with '1' at position (x,y) indicating that the pixel at position (x,y) in FGi is part of the field and '0' indicates that the pixel at position (x,y) in Fgi is not part of the field. The mask is used to describe regions of arbitrary shape. This imaging model is known in the art of image compression and transmission as the Mixed Raster Content model.

The general model for representing the document D is:

$$D=BG0+M0 \times FG0+M1 \times FG1+M2 \times FG2+ \ldots$$

All the values (images) can be multi-level, in which case the masks Mi are alpha channels, and the composition model uses blending. In the case of MRC, the masks are binary—they can only have values '0'or '1'. The preferred embodiment uses MRC, but the present invention applies equally well to alpha channels. Further the present invention applies to fields where the Fgi/Mi images are pre-multiplied to form a single image. While the preferred embodiment uses the + and × operators the present invention applies to an imaging model that represents a document with other operators.

Figure 2:
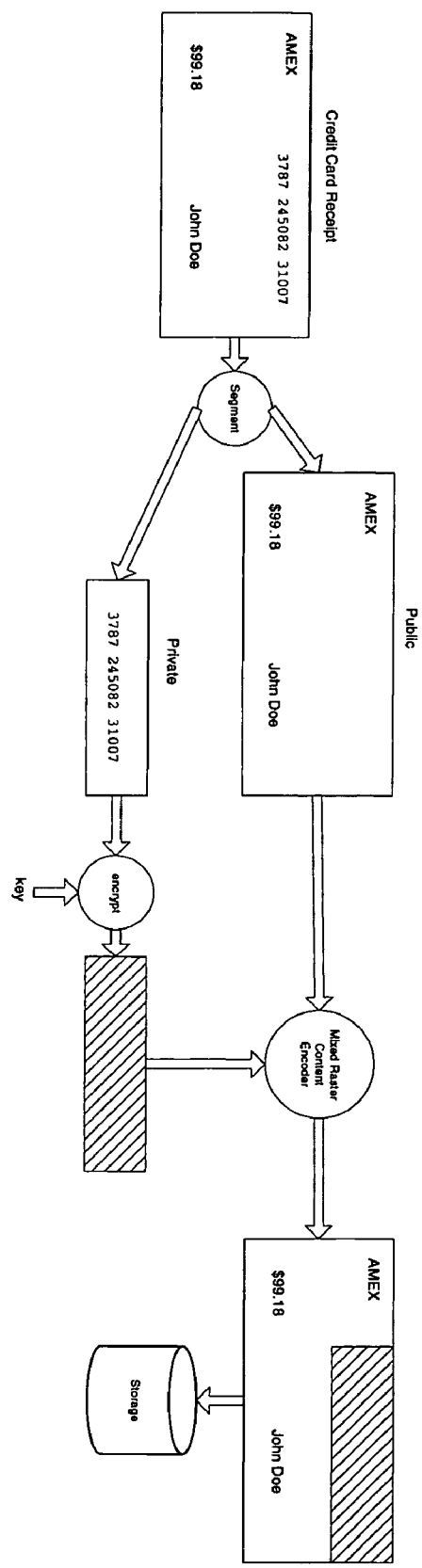
FIG. 2 illustrates secure data input. Confidential data are extracted and stored in a separate encrypted raster layer.
Figure 3:
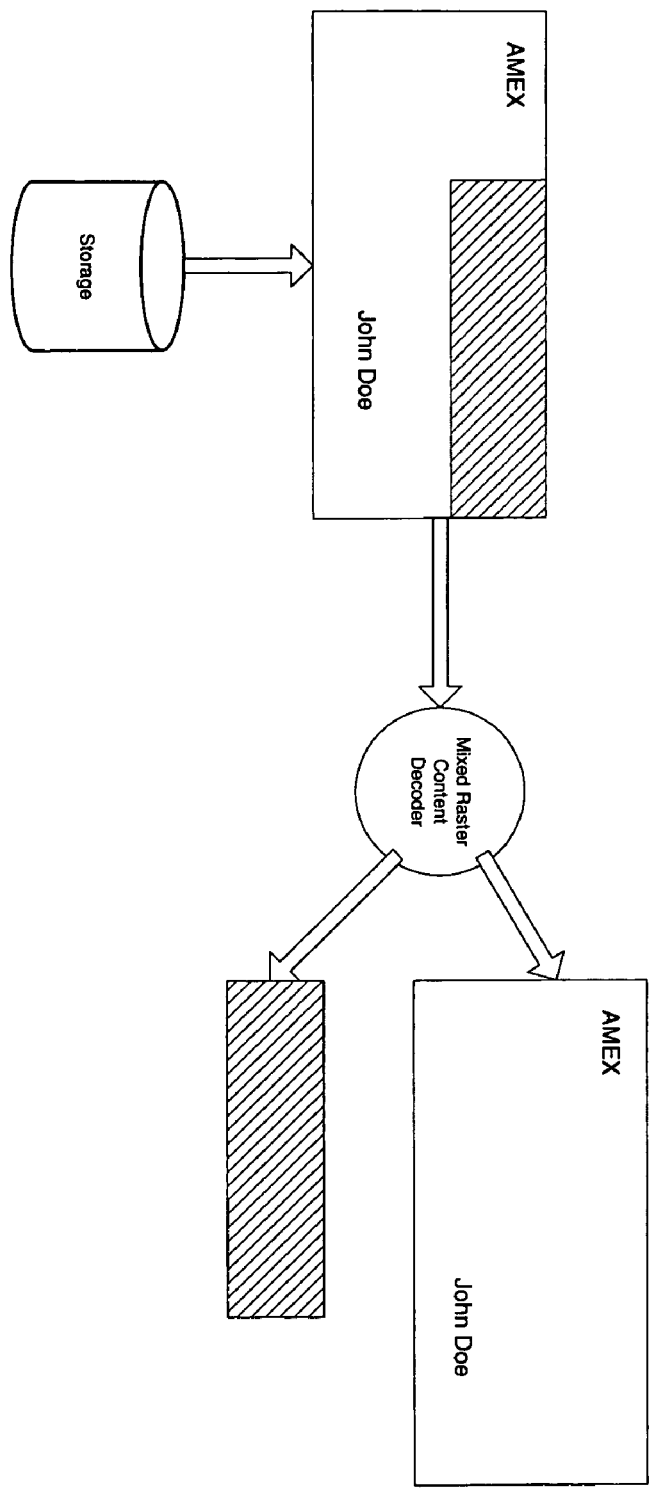
FIG. 3 illustrates a public reader (not trusted) which can only see the un-encrypted raster layer.
Figure 4:
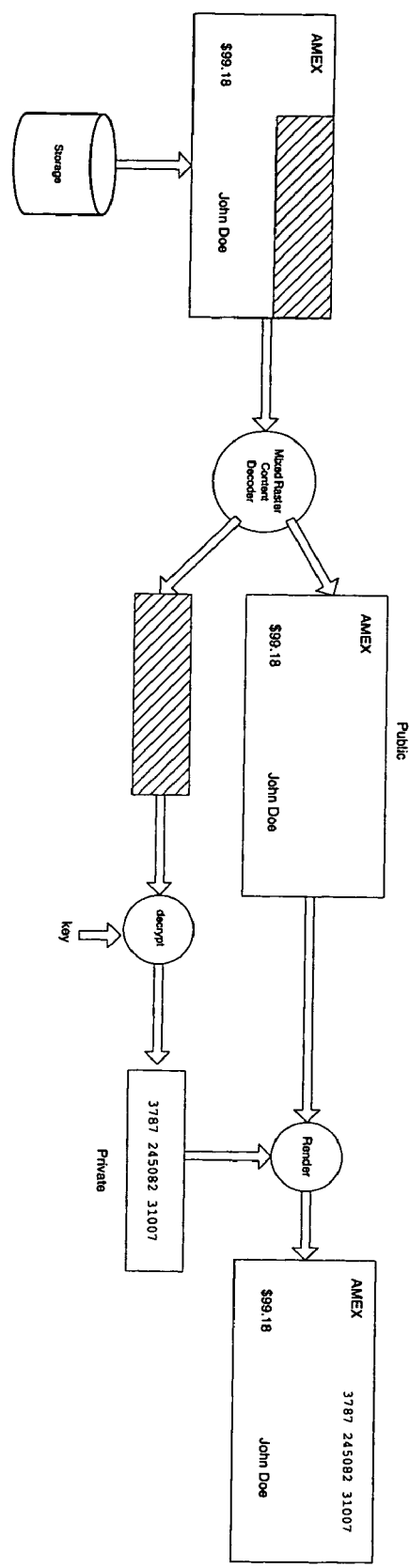
FIG. 4 illustrates a trusted reader which has the key to decrypt the private raster layer to view entire document.

Each security level has a public and private encryption key. Public keys are known to the image processing software while only operators at each respective security level have private keys. The specific public key encryption method for the preferred embodiment is the RSA algorithm described in U.S. Pat. No. 4,405,829, entitled "Cryptographic Communications System and Method." In the preferred embodiment, the background layer, BG0, is left un-encrypted. Each respective field is then encrypted with the public key corresponding to the security level associated with that field. The document image is written to a file in computer memory using a publicly available format such as TIFF-FX with support for encryption. This process is illustrated in FIG. 2. In the preferred embodiment, Profile M of TIFF-FX, a publicly available image format standard, is used to store the output of the segmenter. An operator retrieves a document from the database system by name or some other reference to view or print. If an operator or unauthorized viewer does not have the required security, he or she may only view the public portion of the document as shown in FIG. 3. Otherwise, the operator enters his or her private key. The image viewing software reads the file and uses the private key with the decryption method. Each layer in the image file is processed and displayed. Only those fields correctly decrypted will display correctly and only those fields will be ones that the operator is authorized to view. The operator may now print the viewable image. This process is shown in FIG. 4.

The selectively encrypted file may also reside on a server on a network. Selective decryption can also occur on this server at the behest of an authorized user. In this version of the invention a user is authenticated by any known mechanism to the sever. Server software decrypts the fields or layers that the user is now authorized to view and transmits those image portions to the user for viewing or printing.

Among the concepts, what is disclosed is an image path for work flow or printing in which a scanner or image editor produces a raster image. The raster image is segmented into layers, including a background plus a plurality of objects represented as foreground mask pairs (henceforth the background or a foreground, mask pair will be referred to as a field). Each field possesses a potentially different security level. Each security level corresponds to a private encryption key used to encrypt each layer with its corresponding security level. A publicly known file storage and transmission format that supports mixed raster content is used to store or transmit the raster image. Upon retrieval or reception, a viewer enters a private encryption key into a user interface, such as a computer terminal, a web browser, a portable document assistance (PDA), or other like device. The private key can only decrypt that content to which the viewer is authorized.

Although the system was described as a storage and retrieval system with viewing and printing, one can also use the system as part of a secure facsimile transmission system, wherein a plurality of fields are encrypted with a plurality of public keys known to the scanning system or software. After transmission over a network, the receiver enters his or her private key and prints the image content to which he or she is authorized to view.

With the above-described detailed description of the preferred embodiment (and the alternative embodiment) of the present invention and the above-described variations thereto, one skilled in the art of computer architecture and programming will readily find their specific implementation in accordance herewith. This invention may be embodied in other specific forms without departing from its spirit or essential characteristics. The above-described embodiments are to be considered in all respects only as illustrative and not restrictive in scope. The scope of the invention is, therefore, indicated by the appended claims rather than by the above-detailed description. Therefore, all changes which come within the meaning and range of equivalency of the claims are to be considered embraced within their scope.

What is claimed is:

1. A method for selective encryption of mixed raster content layers in an image path for work flow or printing comprising the steps of:
   obtaining a raster image segmented into layers, including at least one of a background, a foreground, and a mask, wherein each of said layers possesses a different security level;
   corresponding each of said different security levels to an encryption key used to encrypt each of said layers with a corresponding security level;
   transmitting said raster image in mixed raster content format;
   retrieving said transmitted raster image; and
   selectively decrypting said layers using the corresponding encryption key such that the content contained therein can only be viewed by an authorized viewer.

2. A method as in claim 1, wherein said segmented image is obtained from a document image segmenter.

3. A method as in claim 2, wherein said segmenting step is done algorithmically because of prior knowledge of where each field is located in the raster image.

4. A method as in claim 1, wherein said different security level is decided algorithmically because each field has known security level.

5. A method as in claim 1, wherein said step of transmitting occurs over a network of linked computers.

6. A method as in claim 2, wherein said segmenting step is performed using an intelligent segmentation system.

7. A method as in claim 1, wherein said segmented image is obtained from an image editor.

8. A method for selective encryption of mixed raster content layers in an image path for work flow or printing comprising the steps of:
   obtaining a raster image segmented into layers, including at least one of a background, a foreground, and a mask, wherein each of said layers possesses a different security level;
   corresponding each of said different security levels to an encryption key used to encrypt each of said layers with a corresponding security level;
   storing said raster image in mixed raster content format on a server on a network;
   authenticating a user;
   retrieving an authorized field of said raster image stored in mixed raster content format;
   decrypting said authorized field;
   transmitting said raster image to the user; and
   presenting said authorized field to the user.

9. A method for selective encryption of mixed raster content layers in an image path printing comprising the steps of:
   obtaining a raster image segmented into layers, including at least one of a background, a foreground, and a mask, wherein each of said layers possesses a different security level;
   corresponding each of said different security levels to an encryption key used to encrypt each of said layers with a corresponding security level;
   transmitting said raster image in mixed raster content format;
   retrieving said transmitted raster image;
   selectively decrypting said encrypted layers; and
   printing only decrypted layers.

* * * * *